June 22, 1926.
E. M. CHASE
1,589,788
FLOW PAN FOR COATING MACHINES
Filed March 12, 1924 2 Sheets-Sheet 1
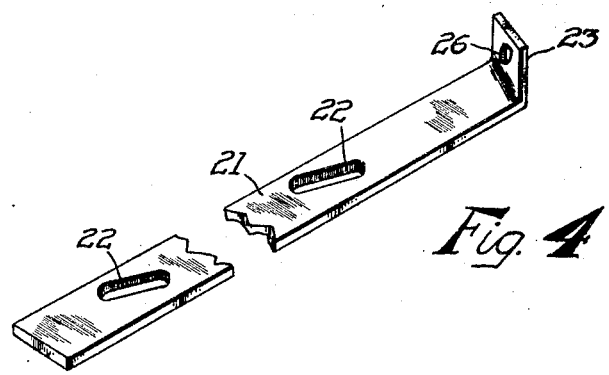
Fig. 4
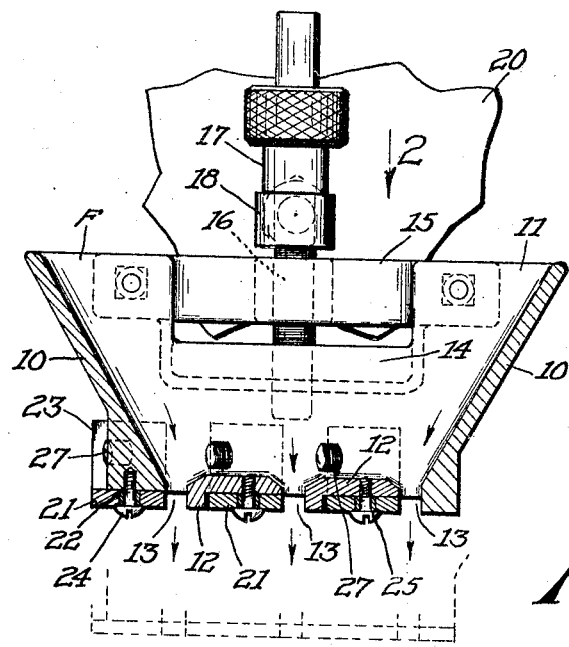
Fig. 1
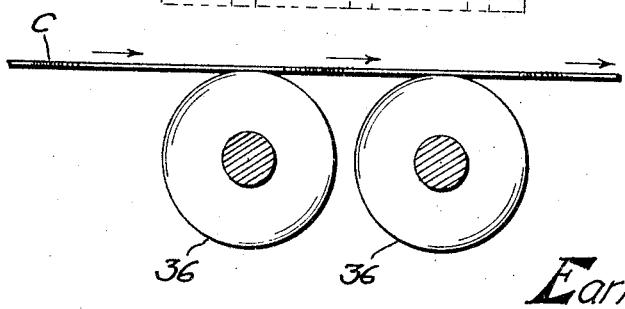
Inventor
Earle M. Chase
By Attorneys
Southgate & Southgate June 22, 1926.
E. M. CHASE
1,589,788
FLOW PAN FOR COATING MACHINES
Filed March 12, 1924 2 Sheets-Sheet 2
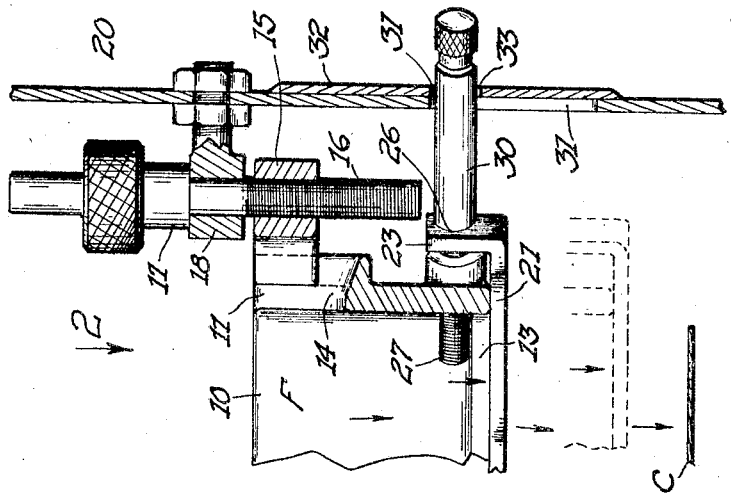
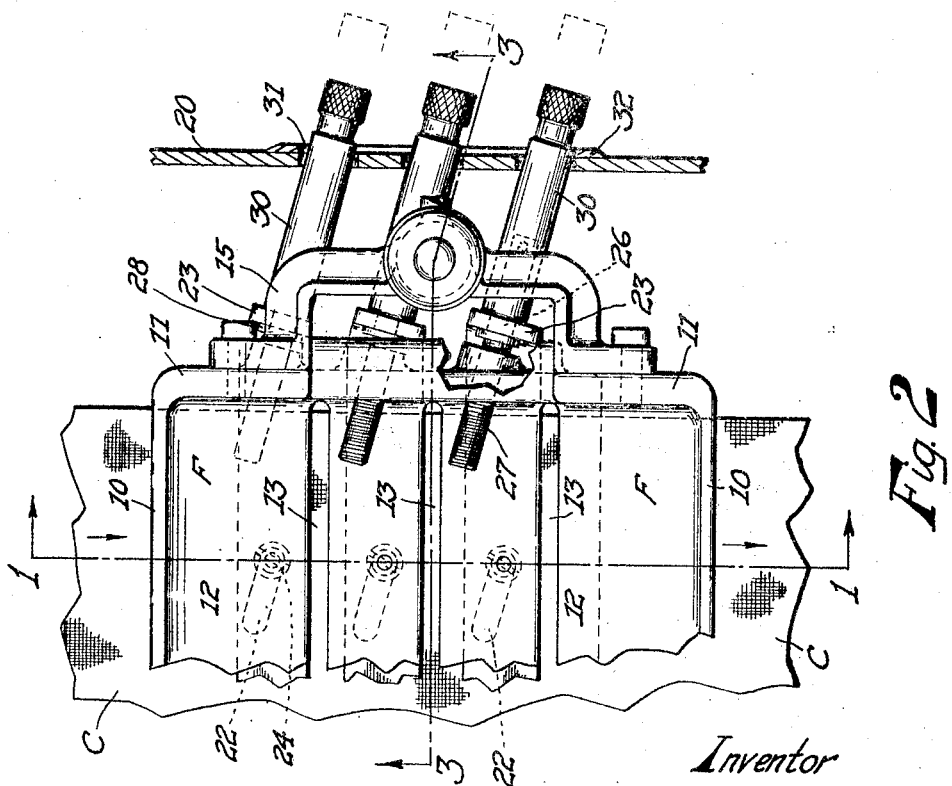
Inventor
Earle M. Chase
By Attorneys
Southgate & Southgate Patented June 22, 1926.

1,589,788

UNITED STATES PATENT OFFICE.

EARLE M. CHASE, OF SPRINGFIELD, MASSACHUSETTS, ASSIGNOR TO UNIVERSAL CANDY AND CHOCOLATE MACHINERY COMPANY, INC., OF SPRINGFIELD, MASSACHUSETTS, A CORPORATION OF MASSACHUSETTS.

FLOW PAN FOR COATING MACHINES.

Application filed March 12, 1924. Serial No. 698,773.

This invention relates to a machine for applying a coating of chocolate to candy or for other similar purposes.

It is the principal object of my invention to provide a new and improved construction of flow pan for such a machine, by which the coating material may be effectively delivered to the article to be coated.

With this general object in view, an important feature of my invention consists in the provision of improved devices for controlling the flow of chocolate as it is delivered from the flow pan. A further feature relates to the provision of efficient means for adjusting the controlling devices and preferably for separately adjusting different parts thereof.

My invention further relates to arrangements and combinations of parts which will be hereinafter described and more particularly pointed out in the appended claims.

A preferred form of the invention is shown in the drawings, in which

Fig. 1 is a sectional end elevation of my improved flow pan;

Fig. 2 is a partial plan view thereof, looking in the direction of the arrow 2 in Fig. 1;

Fig. 3 is a partial longitudinal sectional elevation, taken along the line 3—3 in Fig. 2, and Fig. 4 is a perspective view of one of the plates by which the flow of chocolate is adjusted.

Referring to the drawings, I have indicated a flow pan F having side walls 10, end walls 11 and a bottom 12 provided with a plurality of longitudinally extended delivery slots or openings 13. The side walls 10 are preferably inclined, as indicated in Fig. 1, and one or both of the end walls 11 may be provided with a depressed portion 14 (Figs. 1 and 3) which is adapted to form a spillway from which the surplus chocolate may escape at the end of the flow pan.

The pan F is also provided with brackets 15 secured to the ends thereof and threaded to receive adjusting screws 16 (Fig. 3). The screws 16 are provided with shoulders 17 which rest upon bearing members 18 fixed in the casing 20 of the coating machine. In Figs. 1 and 3 the flow pan is indicated as being positioned at its extreme upward limit of movement, and the lower limit of movement is indicated by broken lines in said figures.

A flow adjusting plate 21 is provided for each plate opening 13 and each of these plates has cam slots 22 (Fig. 4) formed therein and also has an upturned ear 223 angularly positioned at one end thereof. The plates 21 are secured to the under side of the flow pan F by screws 24 threaded into the bottom 12 of the flow pan and extending through bushings 25 slidably fitting the angular slots 22.

The ears 23 at the ends of the plates 21 are provided with openings 26 (Fig. 4) through which extend studs 27 which are threaded into one end wall 11 of the flow pan F. Each stud 27 is provided with a flange or shoulder 28 which engages one side of the ear 23 and is also provided with a handle portion 30 which may be pinned to the stud and engages the opposite side of the ear 23.

The studs 27 are positioned parallel to slots 22, as indicated in Fig. 2, and rotation of any one of the studs will cause movement of the corresponding plate 21 in a direction parallel to the stud and also to the slots 22. Such oblique movement will also cause the edge of the plate 21 to be advanced to close the associated delivery opening 13 in the flow pan and thus reduce and control the flow of chocolate therefrom. It will also be noted that each plate 21 may be separately adjusted, so that the flow through any selected opening 13 may be controlled as desired.

The casing 20 of the coating machine is provided with a series of vertical slots 31 through which the handle portions 30 of the adjusting screws extend, so that the chocolate delivery may be adjusted from the outside of the casing 20. A cover plate 32 is slidably secured outside of the casing 20 and is provided with one or more openings 33 through which the handle portions 30 extend. The plate 32 is supported by the parts 30 and is of such width that it will cover the vertical slots 31 in any position of the flow pan.

During the operation of the machine, it will be understood that the candy or other articles to be coated are carried beneath the flow pan F upon a conveyor C (Fig. 1) which may be supported in any convenient manner as by rolls 36. The vertical adjusting screws 16 provide means by which the flow pan may be positioned at any desired height above the conveyor C, depending upon the size and shape of the articles to be coated.

Having thus described my invention and the advantages thereof it will be evident that changes and modifications can be made in my invention by those skilled in the art within the spirit and scope thereof as set forth in the claims and I do not wish to be otherwise limited to the details herein disclosed but what I claim is:—

1. In a coating machine, a flow plan having a longitudinally extended delivery opening, a plate movable to vary the width of said opening, said plate having guide slots therein disposed at an oblique angle to the length of said delivery opening, studs for said guide slots fixed in said pan, and means to move said plate relatively to said pan and obliquely across said delivery opening.

2. In a coating machine, a flow pan having a plurality of adjacent parallel delivery slots in the bottom thereof and extending lengthwise of said pan, a separate plate for each slot movable to vary the effective width thereof, and separate adjusting means for said plates positioned at the end of said pan and effective to move each plate as a separate unit to adjust the flow through its associated slot only.

3. In a coating machine, a flow pan having a plurality of adjacent parallel delivery slots in the bottom thereof and extending lengthwise of said pan, a separate plate for each slot movable to vary the effective width thereof, and means to separately adjust each plate diagonally across said pan and to thereby vary the effective width of said delivery opening, said adjusting means being positioned at one end of said pan and being connected to the ends of said plates.

4. In a coating machine, a flow pan having a plurality of parallel delivery slots in the bottom thereof, a separate plate for each slot movable to vary the effective width thereof, means to guide each plate for diagonal movement relative to said slots, and separate adjusting screws positioned parallel to the angle of movement of said plates and effective to adjustably position said plates.

5. In a coating machine, a casing, a flow pan, means to raise and lower said pan, devices to adjust the flow from said pan, said devices including adjusting screws extending through vertical slots in the side wall of said casing, and a cover plate supported on said screws and covering said vertical slots in all vertical positions of said pan.

In testimony whereof I have hereunto affixed my signature.

EARLE M. CHASE.